Feb. 8, 1955  W. A. HYLAND ET AL  2,701,513
COLTER FOR GRAIN DRILLS

Filed Jan. 5, 1949  2 Sheets-Sheet 1

INVENTORS.
WILLIAM A. HYLAND
ERNST E. SCHNELL
BY
ATTORNEYS

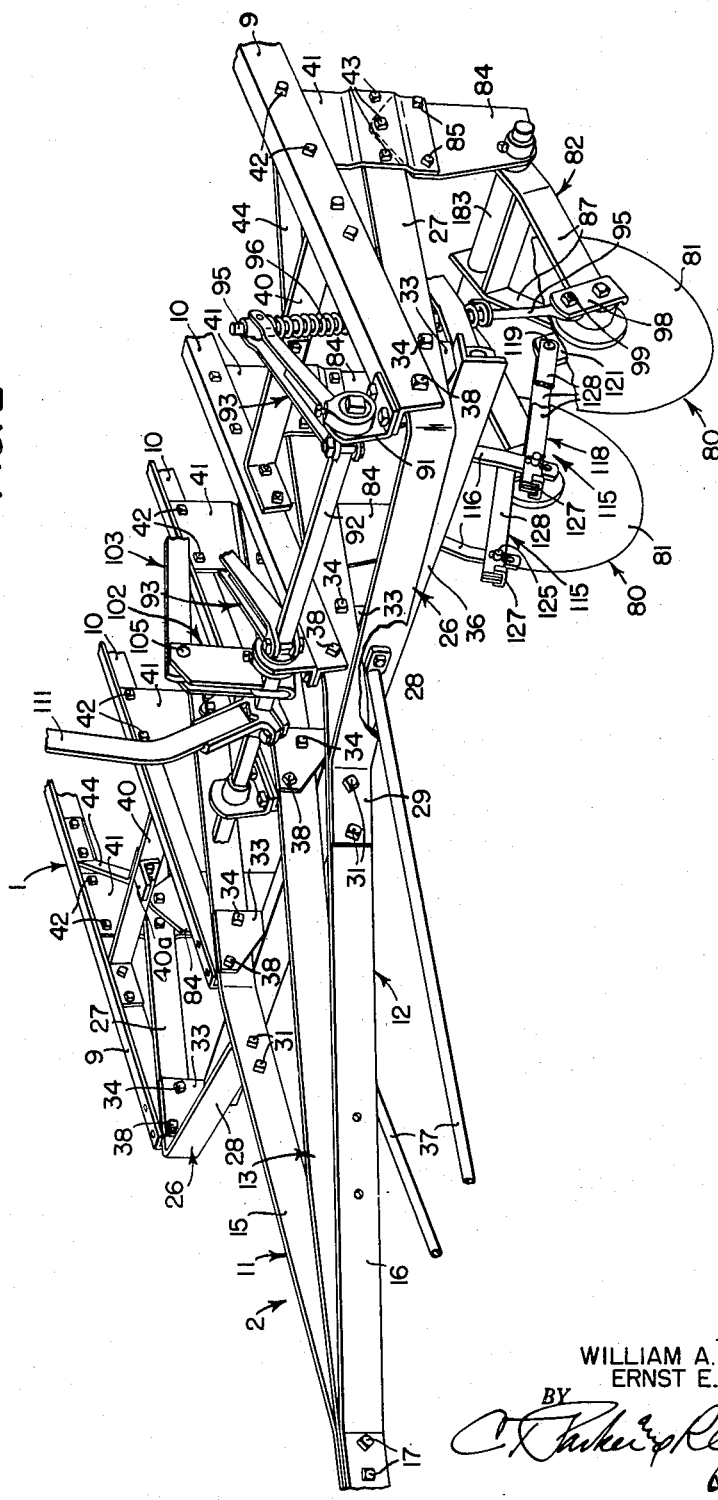

# United States Patent Office 2,701,513
Patented Feb. 8, 1955

2,701,513

COLTER FOR GRAIN DRILLS

William A. Hyland and Ernst E. Schnell, Horicon, Wis., assignors to John Deere Van Brunt Company, Horicon, Wis., a corporation of Wisconsin Application January 5, 1949, Serial No. 69,362

3 Claims. (Cl. 97—245)

The present invention relates generally to agricultural machines and more particular to grain drills and similar implements.

The object and general nature of the present invention is the provision of a new and improved grain drill especially adapted for seeding small grains in land which is farmed according to the so-called stubble-mulch system. In this system of farming all, or substantially all, of the tilling, planting and/or cultivating is performed while maintaining the residues of crops grown on the land for use as a mulch to conserve soil and water. It is, therefore, an important feature of this invention to provide a grain drill or similar implement which is so constructed and arranged as to form a relatively deep clean furrow down to the moist soil and deposit the seed therein without having the grain drill clog up due to the crop residue on the surface of the ground. To this end, it is an important feature of this invention to provide a plurality of colters, one for each of the grain drill furrow openers, and mount them on the grain drill frame so that the colters will cut down through the soil residues on the ground surface and a sufficient distance into the ground to facilitate the formation of seed-receiving furrows by the furrow openers, but without requiring excessive downward pressure on the colters.

These and other objects and advantages of the present invention will be apparent to those skilled in the art after a consideration of the following detailed description, taken in conjunction with the accompanying drawings, in which:

Figure 2 is a fragmentary perspective view showing details of the frame and colter mounting, the colters being shown in their raised position.

Figure 1:
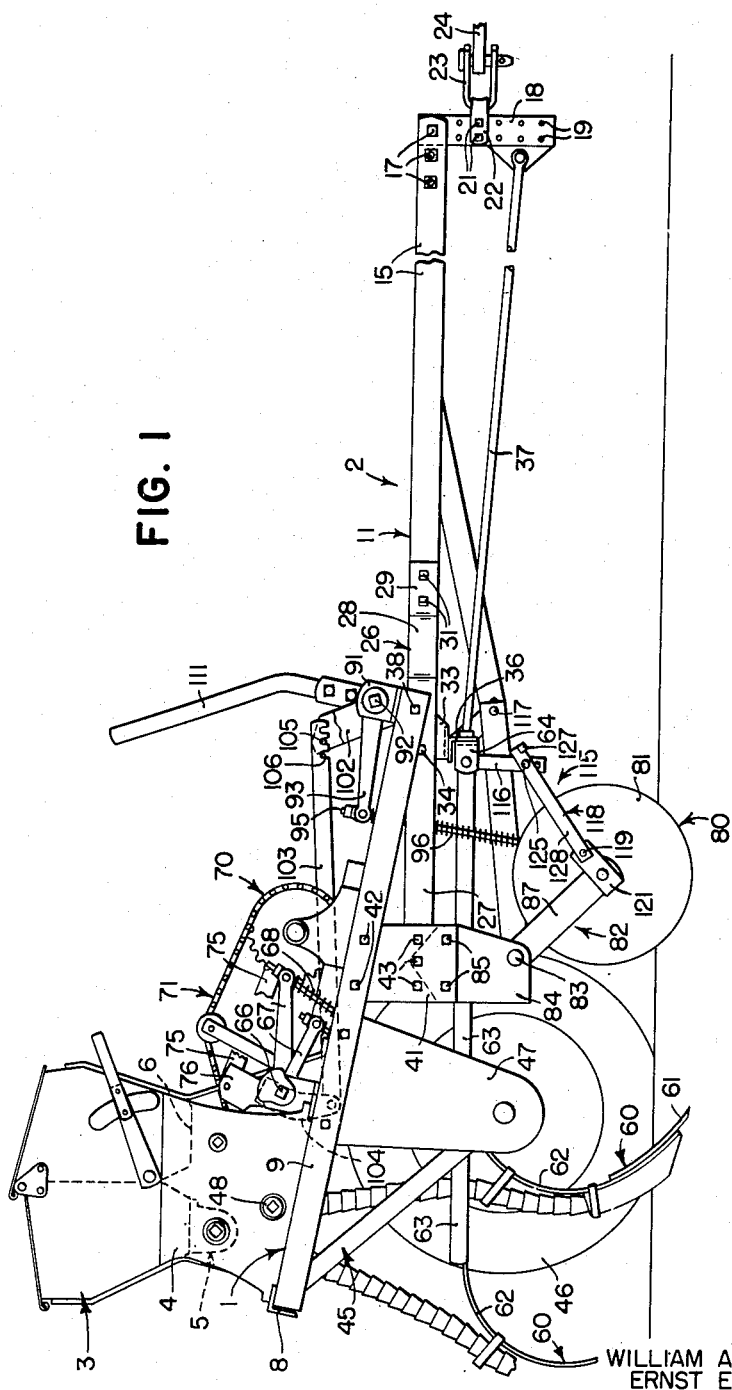
Figure 1 is a side view of a grain drill in which the principles of the present invention have been incorporated.

Referring now to the drawings, the grain drill in which the principles of the present invention have been incorporated includes a main frame 1 and a hitch frame 2. A hopper 3 is mounted, as by side plates 4, on the rear portion of the main frame 1 and may be of any suitable construction such as one in which compartments for both seed and fertilizer are provided and having seed and fertilizing distributing mechanism of any suitable construction and indicated generally by the reference numerals 5 and 6. The main frame 1 includes a rear transverse member, preferably in the form of an angle 8, and right and left hand frame members 9, also in the form of angles, together with two or more intermediate angle members 10 similar to or identical with the end angles 9. The hitch frame 2 includes right and left hand frame bars 11 and 12 and an intermediate frame bar 13. The outer hitch frame bars 11 and 12 include forwardly converging sections 15 and 16, the forward ends of which are fixed, as by bolts 17, to the forward end of the intermediate bar 13 and to a vertically disposed hitch plate 18 having a plurality of apertures 19 therein to receive the bolts 21 by which a hitch clevis 22 may be rigidly connected to the hitch plate 18 in any one of a number of different vertical positions. A clevis 23 provides for connecting the implement to the drawbar 24 of a tractor or other propelling unit. The two clevises 22 and 23 are welded solidly together so as to serve as one hitch part, so as to prevent vertical whip of the hitch due to varying pressure on the colters.

The hitch frame 11 also includes a pair of laterally outer bar members 26 each of which, as best shown in Figure 2, includes a laterally outer rear fore and aft extending section 27 and a laterally inwardly and forwardly disposed section 28 which at its inner end is bent forwardly, as at 29, and connected by bolts 31 to the associated right or left hand frame bar 11 or 12. A pair of depending brackets 33 is fixed, as by bolts 34, to the forwardmost portion of the right and left hand fore and aft extending hitch frame sections 27, and secured, as by welding, to the brackets 33 is a cross angle 36 which is connected by a pair of rods 37 to the lower portion of the vertical hitch plate 18, as best shown in Figure 1. The forward ends of each of the outer and intermediate main frame angles 9 and 10 are connected in any suitable way, as by bolts 38, to the adjacent bars of the hitch frame 11.

The main frame 1 is disposed in a transverse, generally downwardly and forwardly extending inclined plane, and for maintaining the main frame 1 in this relation with respect to the hitch frame 2 the rear ends of the laterally outer fore and aft disposed hitch frame angle sections 27 are connected with the generally intermediate portions of the laterally outer main frame angles 9 by means of a pair of depending brackets 41 bolted, as at 42, to the angles 9 and connected by bolts 43 with the associated ends of the hitch frame sections 27. Similar depending brackets connect the intermediate main frame members 10 with the rear ends of the hitch frame members 11, 12 and 13, thereby forming a rigid frame structure. The frame 1 is reenforced by cross bars 40 (Figure 2) fixed at their ends to the laterally outer pair of angles 9 and 10 and angle braces 44 reenforce the cross bars 40. The latter also form supports for the power lift units which are referred to below, and to this end, each cross bar 40 carries an L-shaped bracket 40a, shown in solid lines in Figure 2.

A drop axle 45 is disposed at each side of the main frame 1 and includes a laterally outwardly directed section upon which the associated supporting wheel 46 is mounted for rotation. The upper ends of the drop axle members 45 are connected by suitable means with the rear main frame angle 8, and a pair of struts 47 connect the wheel-receiving portions of the drop axles 45 with the outer frame angles 9. Both ground wheels 46 are connected by suitable chain and sprocket means (not shown) to drive two axially aligned jackshafts 48 from which through suitable connections the seeding and fertilizing mechanisms 5 and 6 are actuated.

A plurality of furrow openers 60 are disposed generally underneath the hopper 3 and may be of any suitable construction, such as the cultivator-type furrow openers shown in Figure 1, each of which includes a furrow opener element 61 mounted on a spring tooth member 62 that is connected in any suitable way with a drag bar 63, the several drag bars 63 being pivotally connected to associated brackets 64 fixed to the rear side of the transverse frame angle 36 connected by the brackets 33 with the forward portion of the main frame 1. Each of the several drag bars 63 is adapted to be raised and lowered by means of a rockshaft 66 to which a plurality of arms 67 are connected, each arm being connected with the associated drag bar through a spring pressure device 68 of conventional grain drill construction. There are two rockshafts 66, arranged in axially aligned relation, and they are actuated respectively from the jackshafts 48 through two half-revolution clutch units 70 that are driven through chain and sprocket means 71 from the shafts 48, each clutch unit 70 actuating the associated rockshaft 66 through a link 75 which is connected to an arm 76 that is fixed to the rockshaft 66.

In order to form furrows of the necessary depth under the crop residues normally encountered in stubble-mulch farming, we preferably provide a plurality of colters 80, one for each of the furrow openers 60. Each of the colter units includes a colter disk 81 mounted at the forward end of a colter arm unit 82 which is carried at its upper and rear end on a cross shaft 83. The latter is supported by a plurality of brackets 84 which are bolted, as at 85, to the lower portions of the depending brackets 41, as best shown in Figure 1. The two bracket members 41 and 84 form, in effect, one depending bracket and may, if desired, be made of one piece. As described above, a bracket section 41 is connected to each of the fore and aft extending members of the main frame, and similarly, a lower bracket section 84 is fixed to each of the upper depending bracket sections 41, thereby providing a firm and strong support for the colter-carrying cross shaft 83. Each colter-carrying arm 82 includes a pair of right and left hand forwardly converging and forwardly and downwardly extending bars 87 upon which the colter disks 81 are mounted for rotation.

The several colter units 80 are raised and lowered with the raising and lowering of the furrow openers 60 through connections which will now be described. A bracket 91 is fixed to the forward end of each of the main frame fore and aft extending angles 9 and is apertured to receive suitable bearing means in which a rockshaft 92 is carried. A plurality of arms 93 fixed to the rockshaft 92 and extending rearwardly therefrom, serve to raise and lower the associated colter arms 82 through a downwardly extending set of rods 95 and associated spring-pressure devices 96. These parts may be similar to or identical with the spring-pressure units 68 commonly used on grain drills. As best shown in Figure 2, the lower end of each of the rods 95 is connected with the associated colter arm 82 through a clip 98 which is apertured to receive a pivot member 99 by which the lower end of the associated rod 95 is connected therewith. The rockshaft 92 carries one or more arms 102 which are connected through one or more links 103 with an arm or arms 104 carried in depending relation by the rockshaft 66. Preferably, each of the arms 102 comprises a bifurcated member having two sections carrying a stud 105 with which any one of several notches 106 formed in the forward end of the associated link 103 may be engaged. The relation between the colters 80 and the furrow openers 60 may be varied by manually disengaging the link or links 103 from the arms 102 and reestablishing a connection through another notch or notches 106. When the links 103 are disconnected from the arms 102, the colters are controlled by a hand lever 111. In this way, when desired, the colters 80 may be raised to a high position for transporting so that more road clearance is provided.

It will be noted that the colter arms 82 extend downwardly and forwardly. By virtue of this relationship, as best shown in Figure 1, the colter disks 81 have a natural tendency to penetrate without requiring excessive downward pressure applied to them. In order, however, to limit the downward movement of the colter units 80, each is provided with a motion-limiting means in the form of an articulated link unit 115. Each unit 115 comprises an upper link 116 pivotally connected to a bracket 117 fixed to the angle 36, and a lower link 118 pivotally connected, as at 119, to a bracket 121, which may be similar to the bracket 98 mentioned above. That is, of each colter arm unit 82, one of the bars 87 carries the bracket 98 and the opposite bar carries the link-receiving bracket 121. The two links 116 and 118 are pivotally connected together, as at 125, and the upper link 116 may have a plurality of openings to receive the pivot 125 in any one of a number of different positions. In order to prevent the links 116 and 118 from moving into a position of dead-center, the holes in the links 118 receiving the pivot 125 are punched off center, and a stop member 127 is carried by one of the links in a position to engage the other so as to limit movement to a position short of dead-center position. If the links were, for example, permitted to move into a position of dead-center, the subsequent upward movement of the colter-raising arms 93 would not be effective to raise the colters. As best shown in Figure 2, each lower link 118 comprises a pair of strap members 128, and the upper ends of the strap members are interconnected through the stop member 127 which preferably is in the form of a U-shaped clip or the like welded to the upper ends of the straps 128.

The implement described above can be used for a number of different purposes, thereby serving several different farming methods, such as sowing small grains in grass lands, sowing grains in stubble mulch, and for deep placement of fertilizer as practiced by rice farmers and others. In order to accomplish this, there are a number of different combinations of furrow openers which may be used with the above described grain drill. For instance, this implement may be used as a field cultivator by attaching conventional cultivator teeth to the frame. The hopper can either be taken off or left on, as desired. This implement can also be used for grass land seeding by using cultivator type teeth to open the furrows, having attached to the bottom of each of these teeth a spout through which the grain falls to the bottom of the furrow. This is the arrangement shown in Figure 1. Also, each furrow opener disk having a spacing of fourteen inches, more or less, between openers can be provided for use in stubble mulch farming or under other conditions where it is necessary to have a rolling type opener the better to clear the trash and where some ridging of the soil is desired. Conventional furrow openers can also be used and disposed at about half the spacing mentioned above. Further, a type of furrow opener can be used which will place the fertilizer below the seed, this method of fertilizing being desired by rice farmers and others. The rolling colter attachment shown and described above can be used either with the cultivator type openers, as shown in Figure 1, or with the deep furrow openers, and any suitable gang press attachment, conventional so far as the present invention is concerned, can be used for any of the seeding operations mentioned above. The cultivator tooth type of furrow opener, as shown in Figure 1, may be arranged at different spacings as is conventional with grain drills or the like.

While we have shown and described above the preferred structure in which the principles of the present invention have been incorporated, it is to be understood that our invention is not to be limited to the particular details shown and described above, but, in fact, widely different means may be employed in the practice of the broader aspects of our invention.

What we claim, therefore, and desire to secure by Letters Patent is:

1. A grain drill comprising a draft frame including generally laterally spaced apart, fore and aft extending bars, a drill frame disposed in generally downwardly and forwardly inclined position and connected at its forward portions with said draft frame at points forward of the rear ends of said bars, depending brackets carried by said drill frame and receiving the rear portions of at least certain of said draft frame bars, said brackets extending downwardly below said latter bars, other brackets fixed to the outer draft bars, a cross frame member fixed to said other brackets, a plurality of drag bars carrying furrow openers at their rear ends and connected at their forward ends with said cross frame member, said drag bars extending generally rearwardly of and lying above the lower portions of said depending brackets, a cross shaft carried by the lower ends of said depending brackets, a plurality of downwardly and forwardly extending colter arms carried by said cross shaft and having colters at the forward ends, respectively, of said colter arms, said colters being disposed in front of and in longitudinal alignment with said furrow openers, and means for raising and lowering said furrow openers and colters.

2. A grain drill comprising a frame, a pair of depending brackets carried at the ends of said frame, a support member carried by said brackets and disposed transversely with respect to the normal line of travel of the drill, a plurality of downwardly and forwardly extending arms connected at their rear ends to said support member, colters carried at the forward ends of said arms, respectively, a pair of pivotally interconnected links associated with each of said colter-supporting arms, the lower link of each pair being connected with the associated colter-supporting arm and extending upwardly and forwardly therefrom, the other link extending upwardly from the upper and forward end of said lower link, the upper end of said other link being pivotally connected with said frame, means for limiting the pivoting of one link relative to the other of each of said pairs of links so as to limit the downward movement of the colters, said last mentioned means also preventing the links from moving into a straight-line relation which would prevent the raising of the colters, and means carried by said frame and connected with each of said downwardly and forwardly extending arms adjacent the point of connection of said lower links therewith for raising said colters, each of said colter-supporting arms comprising a pair of downwardly and forwardly converging bars, said raising means being connected with one bar of each pair of bars and the motion-limiting means being connected with the other bar.

3. A grain drill comprising a frame, a pair of depending brackets carried at the ends of said frame, a support member carried by said brackets and disposed transversely with respect to the normal line of travel of the drill, a plurality of downwardly and forwardly extending arms carried at their rear ends by said support member, each of said colter-supporting arms comprising a pair of downwardly and forwardly converging bars, a colter carried at the forward end of each arm and disposed between the associated bars, means carried by said frame and connected with each of said downwardly and forwardly extending arms for raising said colters, said raising means being connected with one bar of each pair of bars, and motion-limiting means for each of said arms, each of said motion-limiting means being connected between said frame and the other of the associated bars.

References Cited in the file of this patent

UNITED STATES PATENTS

| | | |
|---|---|---|
| 23,481 | Melendy | Apr. 5, 1859 |
| 612,721 | Hafer | Oct. 18, 1898 |
| 642,676 | Carpenter | Feb. 6, 1900 |
| 781,735 | McGlamery | Feb. 7, 1905 |
| 922,178 | Nelson | May 18, 1909 |
| 941,252 | Hightower | Nov. 23, 1909 |
| 1,113,431 | Groupe | Oct. 13, 1914 |
| 1,136,525 | Heitbrink | Apr. 20, 1915 |
| 1,220,449 | Patterson | Mar. 27, 1917 |
| 1,380,635 | Clark | June 7, 1921 |
| 1,749,974 | Gallagher | Mar. 11, 1930 |
| 2,032,085 | Erdman | Feb. 25, 1936 |
| 2,286,312 | Scarlet et al. | June 16, 1942 |
| 2,371,924 | Scarlet | Mar. 20, 1945 |

FOREIGN PATENTS

| | | |
|---|---|---|
| 704,524 | France | Feb. 23, 1931 |